MARINE PROPULSION DEVICE

Original Filed Sept. 8, 1969 3 Sheets-Sheet 1

Inventor
John A. Langley
By
Whiteley, Whiteley, House & Clemency
Attorneys

MARINE PROPULSION DEVICE

Original Filed Sept. 8, 1969 3 Sheets-Sheet 2

Inventor
John A. Langley
By
Wheeler, Wheeler, House & Clemmons
Attorneys

MARINE PROPULSION DEVICE

Original Filed Sept. 8, 1969 3 Sheets-Sheet 3

Inventor
John A. Langley
By
Whiteley, Whiteley, House & Clemency
Attorneys

United States Patent Office

Re. 27,826

Patented Dec. 4, 1973

27,826

MARINE PROPULSION DEVICE

John A. Langley, Zion, Ill., assignor to Outboard Marine Corporation, Waukegan, Ill.

Original No. 3,589,204, dated June 29, 1971, Ser. No. 855,846, Sept. 8, 1969. Application for reissue June 12, 1972, Ser. No. 261,639

Int. Cl. B63h *5/12;* F16h *35/00*

U.S. Cl. 74—385 32 Claims

Matter enclosed in heavy brackets [ ] appears in the original patent but forms no part of this reissue specification; matter printed in italics indicates the additions made by reissue.

ABSTRACT OF THE DISCLOSURE

Disclosed herein is a marine propulsion device which includes a drive shaft housing having upper and lower housing sections, and in which the upper housing section is rotatably supported for movement about a horizontal tilt axis by oppositely extending trunnions which are received in inwardly open coaxial apertures in spaced supporting members fixed to the boat hull. Power is transferred from the engine output shaft to a drive shaft by a horizontal cross shaft which is rotatably supported in coaxial relation to the tilt axis and between the trunnions by a gear case having first and second gear case sections. The first gear case section is fixed to the boat hull. The second gear case section is integral with the upper end of the drive shaft housing. Steering is afforded by rotating the lower drive shaft housing section by a steering linkage which includes a worm wheel sector on the lower housing section and a worm gear which is rotated by a drive which includes a stub shaft rotatably supported within one of the trunnions.

BACKGROUND OF INVENTION

The invention relates to marine propulsion devices of the type which are commonly called stern drive or inboard-outboard propulsion units and in which the engine is mounted forwardly of the transom and power is supplied to a propeller through the transom.

SUMMARY OF INVENTION

The invention provides a compact marine propulsion device which includes a drive shaft housing having upper and lower housing sections with the lower housing section rotatably connected to the upper housing section to provide a steering axis. Means are provided for rotatably supporting the drive shaft housing for vertical tilting movement about a horizontal tilt axis. The means includes a pair of outwardly extending trunnions which are received in inwardly open coaxial apertures in spaced clam shell shaped supporting members which are fixed to the boat hull and extend aftward of a transom opening.

The overall size of the upper end of the drive shaft housing and of the means for rotatably supporting the drive shaft housing are minimized by a construction which includes a split gear case having first and second gear case sections which rotatably support a horizontally extending power transfer shaft or cross shaft which connects the engine output shaft or input shaft to a drive shaft in the drive shaft housing. The first gear case section is fixed relative to the boat hull and the second gear case section is provided with a recess for carrying end moves with the upper housing section during tilting movement of the drive shaft housing. The first and second gear case sections have complementary adjoining surfaces which interfit to provide a compact gear case. Each gear case section is provided with a recess for carrying end bearings for the power transfer shaft and with annular wall portions which together form a sleeve for carrying intermediate bearings.

The width of the propulsion device is minimized by recessed wall portions on opposite sides of the drive shaft housing. When the propulsion device is in the normal running position, complementary wall portions on the supporting members are received in the recessed wall portions.

The invention also provides a steering arrangement for rotating the lower housing section to steer the boat hull. The steering components require a minimum of space and include a worm wheel sector integral with the lower housing section and a worm gear which is in mesh with the worm wheel sector.

The worm gear is rotated by a steering linkage which includes a stub shaft which is rotatably supported within one of the trunnions in coaxial relation with the horizontal tilt axis and the power transfer shaft. The stub shaft carries input and output gears. The input gear is connected to a steering shaft which is rotatably supported in one of the drive shaft housing supporting members and is connectable to conventional remote control steering apparatus. The output gear is connected to a gear on a downwardly inclined shaft which is rotatably supported in the upper housing section. The downwardly inclined shaft has a gear which meshes with a gear on a shaft carrying the worm gear.

It is an object of the invention to provide a marine propulsion device which utilizes a split gear case for rotatably supporting a horizontal cross shaft and to provide a compact drive shaft housing which extends aftward of a small transom opening.

It is a further object of the invention to provide a marine propulsion device in which the upper housing section of a two part drive shaft housing is rotatably supported for tilting movement about a horizontal tilt axis by hollow horizontally extending trunnions which are received in coaxial apertures in spaced support members.

It is an additional object of the invention to provide a marine propulsion device in which the lower housing section of a two part drive shaft housing is steerable about the drive shaft axis by an arrangement which includes a worm wheel sector integral with a projecting portion of the lower housing section and a worm wheel which is rotated by a steering drive which includes a stub shaft rotatably supported in the hollow interior of one of the trunnions.

It is a further object of the invention to provide a compact marine propulsion device in which the drive shaft housing has recessed wall portions which receive complementary wall portions of opposed supporting members.

Further objects and advantages of the invention will become apparent from the following description and accompanying drawings.

DRAWINGS

DETAILED DESCRIPTION

Figure 1:
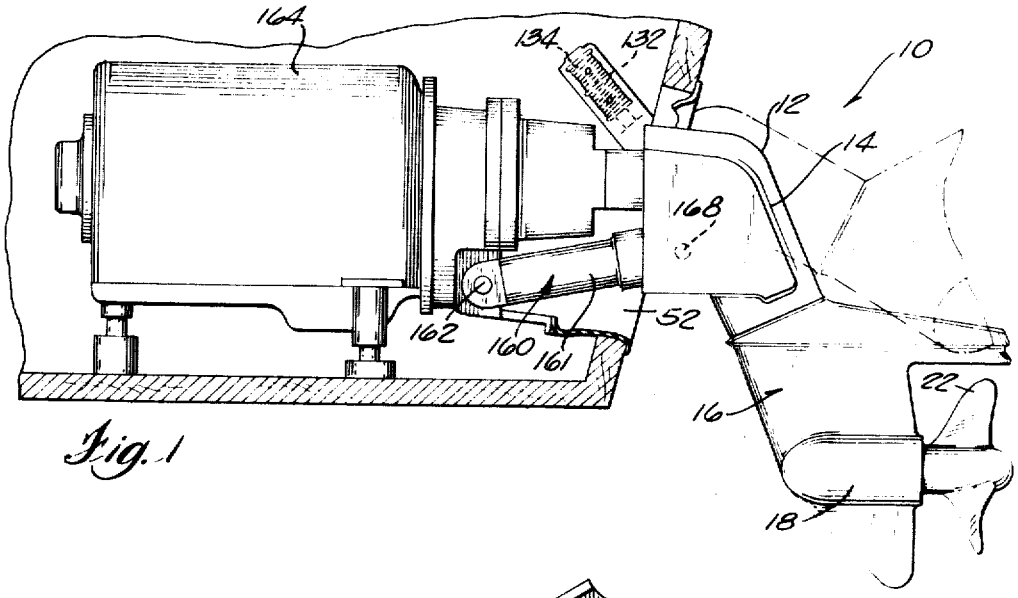
FIG. 1 is a side elevational view of a marine propulsion device in accordance with the invention.

Referring to the drawings, FIG. 1 discloses a marine propulson device which is in acordance with the invention, which is generally designated 10, and which includes a drive shaft housing 12 having upper and lower parts or housing sections 14 and 16, respectively. The lower housing section 16 includes a gear case 18. A propeller shaft 20 (FIG. 4) is rotatably supported in the gear case and carries a propeller 22. To facilitate steering of the lower housing section as hereinafter described, the lower housing section 16 is provided with a projecting portion 24 (FIGS. 4 and 5) which extends into the upper housing section 14 and is rotatably supported at its upper end by a bearing 26 supported by a bearing holder 28. The lower end of portion 24 is secured to an upper wall 30 of the lower housing section by bolts 32. A bearing 31 supports the lower end of portion 24. A drive shaft 34 is rotatably supported in the upper housing section by bearings 35 and 36. The drive shaft 34 is connected to the propeller shaft 22 by gearing 37 FIG. 4).

Figure 4:
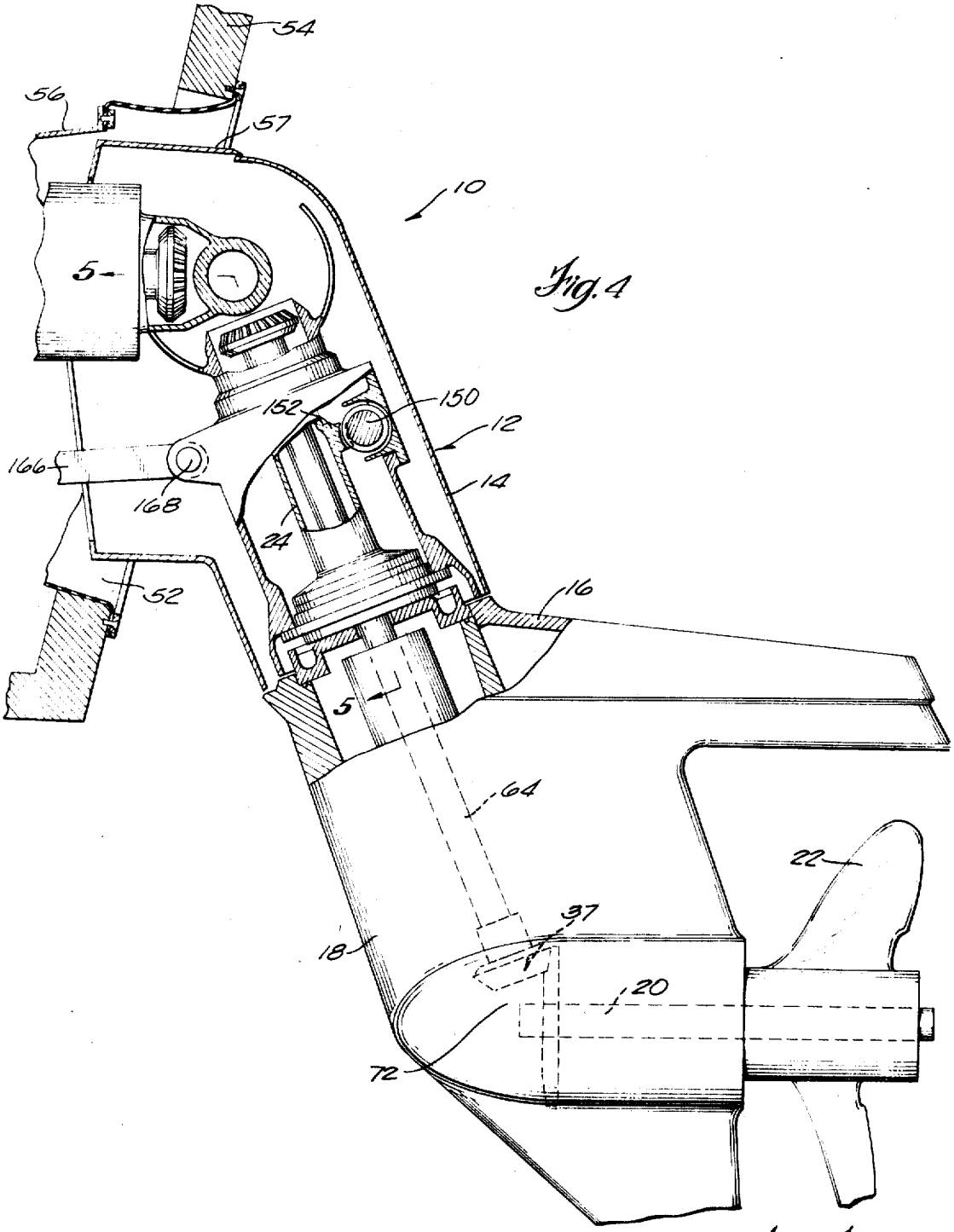
FIG. 4 is an enlarged side view in fragmentary section of the marine propulsion device shown in FIG. 1.
Figure 5:
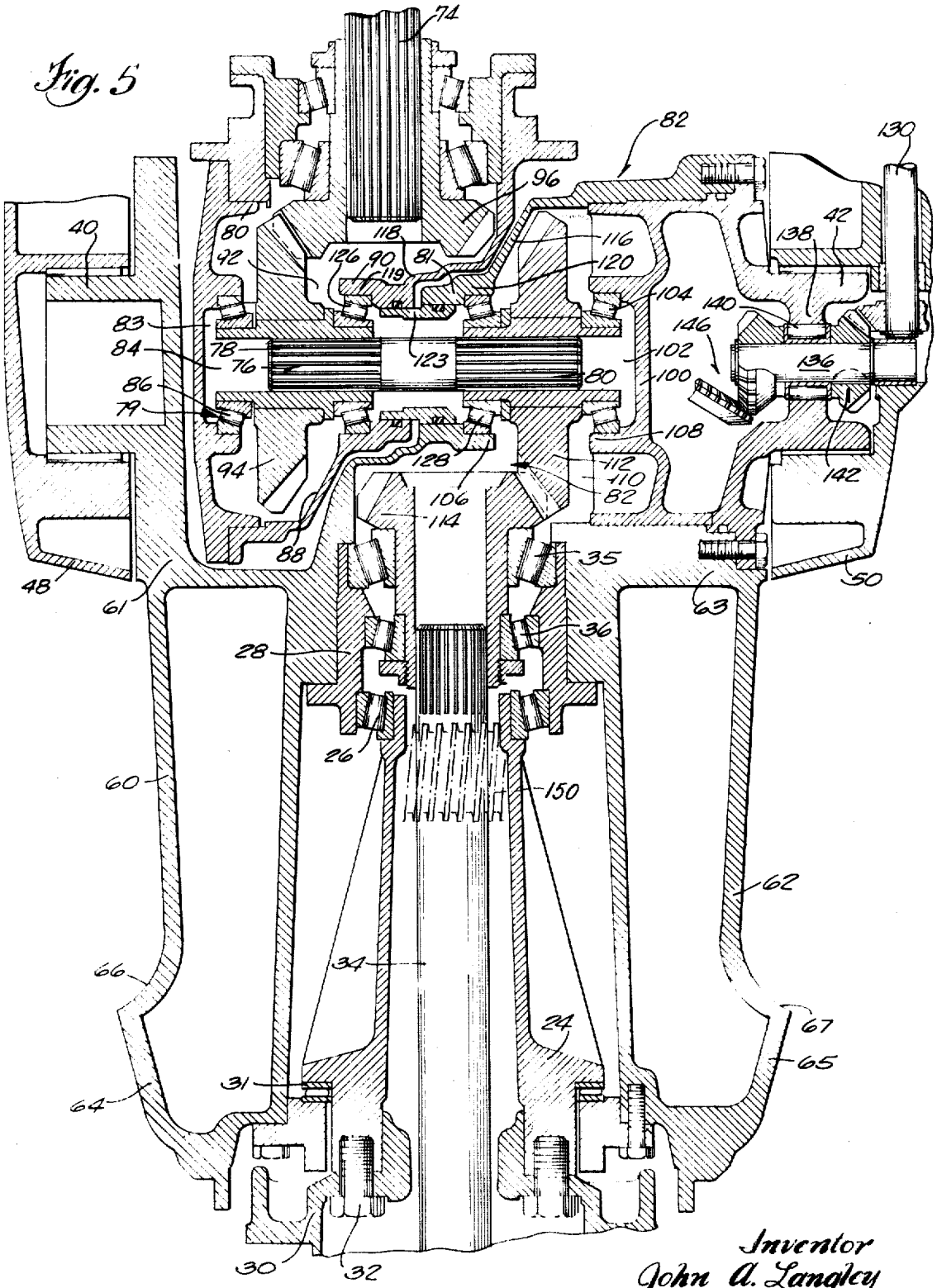
FIG. 5 is a fragmentary plan sectional view of the marine propulsion device taken along 5—5 of FIG. 4 with the drive shaft housing tilted upwardly from the normal running position to the position shown in broken lines in FIG. 1.

In accordance with the invention, means are provided for rotatably supporting the drive shaft housing from a boat hull for vertical swinging movement about a horizontal tilt axis. In the disclosed construction, the means includes, on the upper end of the drive shaft housing section 14, a pair of laterally outwardly extending hollow trunnions, respectively 40 and 42 (FIG. 5). The means also includes a pair of spaced clam shell shaped supporting members 48 and 50 which have inwardly open coaxial apertures, and which extend through a transom opening from a fixed connection either to the boat hull or to the engine. The supporting members 48 and 50 can be integral and joined by wall portions including an upper wall portion 57 (FIG. 4). The clam shell members 48 and 50 can be fixed directly to the transom or to a clutch housing 56 which can be secured either directly to a boat hull or through a boat mounted engine.

Figure 2:
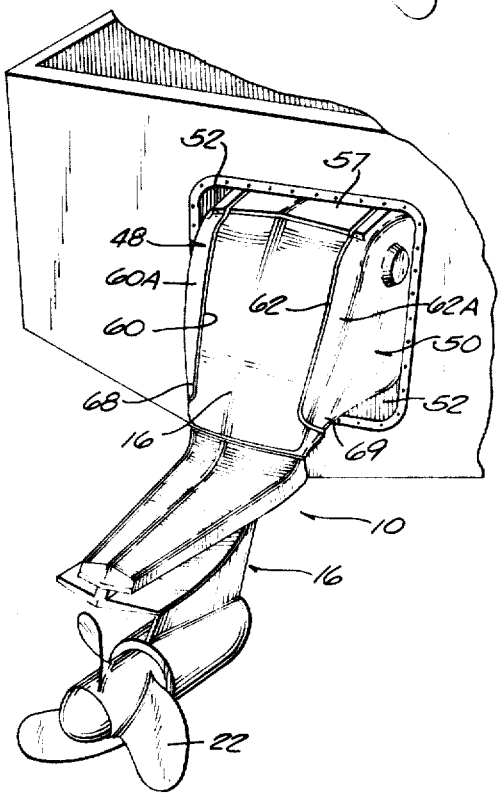
FIG. 2 is a rear perspective view of the marine propulsion device shown in FIG. 1.

To minimize the size of the transom opening 52 and provide a compact propulsion device, the upper housing section 16 has recessed wall portions 60 and 62 (FIGS. 2 and 5) which are complementary to the wall portions 60A and 62A of the supporting members 48 and 50 and which extend from upper wall portions 61 and 63 of housing section 16 to lower wall portions 64 and 65. The wall portions 60 and 62 have curved parts 66 and 67 which receive the lower curved edges 68 and 69 (FIG. 2) of supporting members 48 and 50. When the drive shaft housing 12 is in the normal running position shown in FIG. 2, the complementary wall portions 60, 62, and 60A and 62A interfit to provide a smooth, substantially continuous outer surface.

The drive train for connecting the engine output shaft or input shaft 74 of the marine propulsion device includes a cross-shaft 76. The cross-shaft 76 has a first end 78 and a second end 80.

In accordance with the invention, means are provided for rotatably supporting the cross-shaft 76 in coaxial relation with the horizontal tilt axis. In the disclosed construction, the means comprises a split gear case generally indicated as 82, which gear case has first and second gear case sections 79 and 81. The first or relative fixed section 79 is secured or connected to the fixed housing 56 (FIG. 1) and includes a wall portion 83 (FIG. 5) which defines a recess or receptacle 84 housing a bearing 86 which is supported by the wall portion 83 and receives the first end 78 of the cross-shaft 76. The first gear case section 79 of the gear case 82 also includes wall portions 88 and 90 which define an opening 92 in which a first bevel gear 94 carried by the cross-shaft 76 engages a second bevel gear 96 which is secured to the input shaft 74.

The second gear case section 81 is integral with or attached to the upper part of the upper housing section 14 and includes a wall portion 100 which defines a recess or receptacle 102 which carries a bearing 104 for rotatably supporting the second end of the cross-shaft 76. The second gear case section 81 also includes wall portions 106 and 108 which define an opening 110. A third bevel gear 112 extends through the opening 110 and meshes with a fourth bevel gear 114 which is secured to the upper end of the drive shaft 34.

The second gear case section 81 also includes a wall portion 116 which extends generally transversely to the cross-shaft and interfits with a complementary wall portion 118 on the first gear case section 79. To support the cross-shaft 76 intermediate its ends, the first and second gear case sections 79 and 81 are provided with annular flanges or wall portions 119 and 120 which extend from wall portions 116 and 118 and which can also be provided with recesses or stepped wall portions to receive bearings 126 and 128 which rotatably support the shaft 76. The first and second gear case sections 79 and 81 are interconnected by an annular seal 123 which prevents loss of lubricant.

In accordance with the invention, means are provided for rotating the lower housing section to afford steering of the boat hull. In the disclosed construction, such means includes a first shaft 130 which is rotatably supported in supporting member 50 and which extends through the transom for connection to conventional remote steering apparatus which can include a drum 132 and a cable 134 as shown in FIG. 1. The means also includes a second shaft or stub shaft 136. Means are provided for rotatably supporting the second shaft 136 in coaxial relation with the horizontal tilt axis. As disclosed, the means comprises an inturned annular wall portion 138 within trunnion 42 and a bearing 140 supported by the wall portion 138. The second shaft 136 is connected to the first shaft 130 by gearing 142.

Figure 3:
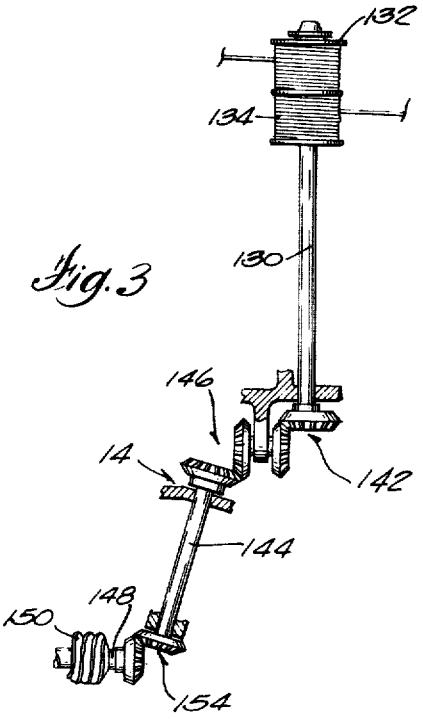
FIG. 3 is a fragmentary view showing the steering linkage or drive for the marine propulsion unit shown in FIG. 1.

The means for rotating the lower housing section 16 also includes a third shaft 144 which is rotatably supported in the upper housing section 14. The third shaft 144 is connected by gearing 146 to the second shaft 136. To connect the third shaft 144 to the lower housing section, there is provided a fourth shaft 148 (FIG. 3) which is rotatably supported in the upper housing section 14 and is provided with a worm gear 150. The worm gear 150 meshes with a worm wheel sector 152 (FIG. 4) which is integral with or secured to the projecting portion 24 of the lower housing section 16. The fourth shaft 148 is connected to the third shaft 144 by gearing 154.

During operation of the marine propulsion unit 10, and during tilting of the drive shaft housing 12 about the horizontal tilt axis, the third shaft 144 tilts with the drive shaft housing 12 and orbits around the second shaft 136 with all gears remaining in mesh to thus provide steering capability at all angles of tilt of the drive shaft housing 12.

The marine propulsion device can also be provided with means for selectively varying the angle of tilt of the drive shaft housing 12 relative to the normal running position. The means can be in the form of a hydraulic cylinder means 160 (FIG. 1) which include a cylinder 161 and a piston rod 166. The piston rod 166 or cylinder 161 can be pivotally connected at 168 to the upper drive shaft housing 14 (FIG. 4) and the other of the piston rod 166 or cylinder 161 can be connected to the boat hull or fixed housing 56 at 162.

Various of the features of the invention are set forth in the following claims.

I claim:

1. A marine propulsion device comprising a drive shaft housing, *horizontally spaced* means for rotatably supporting said drive shaft housing for vertical swinging movement about a horizontal tilt axis and relative to a boat hull, a drive shaft rotatably supported in said drive shaft housing, a horizontal cross shaft, gearing for connecting said cross shaft to said drive shaft, a first gear case section for supporting one part of said cross shaft, said first gear case section being *located between said spaced supporting means and being* adapted to be fixed relative to the boat hull, and a second gear case section on said drive shaft housing for supporting another part of said cross shaft, said second gear case section being *located between said spaced supporting means and being* movable with said drive shaft housing about said horizontal tilt axis during tilting movement of said drive shaft housing.

2. A marine propulsion device in accordance with claim 1, wherein said first and second gear case sections have adjacently located generally annular wall portions which together form a sleeve which is coaxial with the horizontal tilt axis and which receives said cross-shaft, and bearings in said sleeve for rotatably supporting said cross-shaft.

3. A marine propulsion device in accordance with claim 1, wherein said first and second gear case sections and include opposed spaced wall portions which define recesses and bearings located in said recesses for rotatably supporting said cross-shaft.

4. A marine propulsion device in accordance with claim 2, including a seal interconnecting said wall portions of said sleeve to prevent escape of lubricant from said sleeve.

5. A marine propulsion device in accordance with claim 1, wherein said means for rotatably supporting said drive shaft housing for vertical swinging movement about a horizontal tilt axis comprises a pair of oppositely extending trunnions on said drive shaft housing, and a pair of spaced support members adapted to be fixed relative to a boat hull, said support members having coaxial apertures for receiving and rotatably supporting said trunnions.

6. A marine propulsion device in accordance with claim 5, wherein said drive shaft housing includes a drive shaft housing part rotatable about said drive shaft axis, and means for rotating said part of said drive shaft housing to steer a boat hull.

7. A marine propulsion device in accordance with claim 6, wherein said means for rotating said part of said drive shaft housing to steer a boat hull comprises a first shaft rotatably supported in one of said support members and connectable to remote steering apparatus, a second shaft, means for rotatably supporting said second shaft in coaxial relation to said horizontal tilt axis, gearing connecting said first shaft to said second shaft, a third shaft rotatably supported in said drive shaft housing, gearing connecting one end of said third shaft to said second shaft, a fourth shaft, said fourth shaft carrying a worm gear, gearing connecting one end of said fourth shaft to said third shaft, and a gear sector connected to said rotatable part of said drive shaft housing, said gear sector being in mesh with said worm gear on said fourth shaft.

8. A marine propulsion device in accordance with claim 7, wherein said means for rotatably supporting said second shaft in coaxial relation to said tilt axis comprises an inturned annular flange in one of said trunnions, and a bearing supported by said flange, said bearing, rotatably supporting said second shaft.

9. A marine propulsion device comprising a drive shaft housing, said drive shaft housing having upper and lower housing sections with said lower housing section rotatably connected to said upper housing section for rotation about a steering axis, said upper drive shaft housing having a pair of oppositely extending generally horizontal trunnions, a pair of spaced supporting members adapted to be fixed relative to a boat hull, coaxial apertures in each of said supporting members for receiving said trunnions to rotatably support said drive shaft housing for vertical tilting movement about a horizontal tilt axis, a first shaft rotatably supported in one of said supporting members, a second shaft rotatably supported within one of said trunnions, gearing connecting said second shaft to said first shaft, a third rotatably supported in said upper housing section, gearing connecting one end of said third shaft to said second shaft, a fourth shaft rotatably supported in said upper housing section, a gear carried on said fourth shaft, a gear sector connected to said lower housing section, a gear on said fourth shaft in mesh with said gear sector and gearing connecting said fourth shaft to said third shaft.

10. A marine propulsion device comprising a drive shaft housing having opposite sides with recessed wall portions, a pair of spaced supporting members adapted to be fixed relative to a boat hull and extend aftward adjacent to a transom opening, said supporting members having wall portions complementary to said recessed wall portions in said drive shaft housing, said wall portions of said supporting members being received in said recesses in said drive shaft housing when said drive shaft housing is in the normal running position, and means for rotatably supporting said drive shaft housing between said supporting members for tilting movement about a horizontal tilt axis.

11. A marine propulsion device comprising a drive shaft housing, *horizontally spaced* means *adapted to be fixed relative to a boat hull* for rotatably supporting said drive shaft housing for vertical swinging movement relative to [a] *the* boat hull about a horizontal tilt axis, a drive shaft rotatably supported in said drive shaft housing, a horizontal cross shaft [having first and second ends] for transferring power from an input shaft to said drive shaft *and including axially spaced first and second parts located between said spaced support means,* means stationary with respect to the boat hull for rotatably supporting said first [end] *part* of said cross shaft in coaxial relation with said horizontal tilt axis, and means on said drive shaft housing ad movable with said drive shaft housing about said horizontal tilt axis for rotatably supporting said second [end] *part* of said cross shaft in coaxial relation with said horizontal tilt axis.

12. A marine propulsion device comprising a drive shaft housing, *horizontally spaced* means *adapted to be fixed relative to a boat hull* for rotatably supporting said drive shaft housing for vertical swinging movement relative to [a] *the* boat hull about a horizontal tilt axis, a drive shaft rotatably supported in said drive shaft housing, a horizontal cross shaft *having axially spaced first and second parts,* a first bearing receiving said first cross shaft *part* and carried by said drive shaft housing concentrically with said tilt axis *and between said horizontally spaced supporting means,* a supporting member adapted to be fixed relative to the boat hull, and a second bearing receiving said *second* cross shaft *part* and carried by said supporting member concentrically with said tilt axis *and between said horizontally spaced supporting means.*

13. A marine propulsion device in accordance with claim 12, including sealing means between said drive shaft housing and said supporting member, said sealing means being concentric with said tilt axis.

14. A marine propulsion device in accordance with claim 1 wherein said drive shaft housing also includes a lower housing section rotatable relative to said second gearcase section about an axis perpendicular to said horizontal axis, and a linkage including a part extending coaxially with said horizontal axis for steering actuation of said lower housing section regardless of the position of said drive shaft housing relative to said horizontal tilt axis.

[15. A marine propulsion device comprising a drive shaft housing having means affording vertical tilting movement about a horizontal axis relative to a boat hull and also having upper and lower housing sections with said lower housing section rotatably connected to said upper housing section for rotation about a steering axis and a linkage connected to said lower housing section and including a part extending coaxially with said horizontal axis for steering actuation of said lower housing section regardless of the position of said drive shaft housing relative to said horizontal tilt axis.]

[16. A marine propulsion device in accordance with claim 15 wherein said part is supported for rotary movement coaxially with said horizontal tilt axis and extends, at least in part, within said drive shaft housing.]

17. A marine propulsion device comprising a drive shaft housing, first and second spaced means for rotatably supporting said drive shaft housing for vertical swinging movement relative to a boat hull about a horizontal tilt axis, a drive shaft rotatably supported in said drive shaft housing, a horizontal cross shaft drivingly connected to said drive shaft and adapted to be rotated by a power input shaft and including axially spaced first and second parts, means on said drive shaft housing rotatably supporting said first cross shaft part concentrically with said tilt axis and axially inwardly of said spaced means for supporting said drive shaft housing, a supporting member adapted to be fixed relative to the boat hull, and means on said supporting member rotatably supporting said second cross shaft part concentrically with said tilt axis and axially inwardly of said spaced means for supporting said drive shaft housing.

18. A marine propulsion device in accordance with claim 17 including a first bevel gear fixed to said cross shaft and adatped to receive power from the power input shaft, a second bevel gear fixed to said cross shaft, and a third bevel gear in mesh with said second bevel gear and fixed to said drive shaft.

19. A marine propulsion device in accordance with claim 17 and further including a first gear case section adapted to be fixed relative to the boat hull and including said means on said supporting member rotatably supporting said cross shaft, and a second gear case section on said drive shaft housing and movable with said drive shaft housing about said horizontal tilt axis during tilting movement of said drive shaft housing, said second gear case section including said means on said drive shaft housing rotatably supporting said cross shaft.

20. A stern drive unit comprising a first member adapted to be secured to a boat adjacent the stern thereon, a second member connected to said first member for vertical tilting movement about a horizontal axis, a third member connected to said second member for steering movement about an axis transverse to said horizontal axis, a first steering shaft rotatably mounted on said first member with the rotary axis of said first shaft extending in a plane radial with respect to said horizontal axis, a second steering shaft rotatably mounted on said second member with the rotary axis of said second shaft extending in a plane radial with respect to said horizontal axis, means connecting said second steering shaft to said third member for steering movement of said third member relative to said second member in response to rotation of said second steering shaft, and means connecting said first and second steering shafts and operable to effect rotation of said second steering shaft in response to rotation of said first steering shaft, notwithstanding variation in the tilt relation between said first and second members.

21. A stern drive unit comprising a first member adapted to be secured to a boat adjacent the stern thereof, a second member connected to said first member for vertical tilting movement about a horizontal axis, a third member connected to said second member for steering movement about an axis transverse to said horizontal axis, a first steering shaft rotatably mounted on said first member with the rotary axis of said first shaft extending from said horizontal axis, a second steering shaft rotatably mounted on said second member with the rotary axis of said second shaft extending from said horizontal axis, means connecting said second steering shaft to said third member for steering movement of said third member relative to said second member in response to rotation of said second steering shaft, and means connecting said first and second steering shafts and operable to effect rotation of said second steering shaft in response to rotation of said first steering shaft, notwithstanding variation in the tilt relation between said first and second members.

22. A marine propulsion device comprising a first member adapted to be secured to a boat adjacent the stern thereof, a second member connected to said first member for vertical tilting movement relative thereto about a horizontal axis, a third member connected to said second member for pivotal movement relative thereto about an axis tranesverse to said horizontal axis, first and second steering shafts respectively rotatably mounted on said first and second members in respective planes extending radially with respect to said horizontal axis, means connecting said second steering shaft to said third member for steering movement of said third member relative to said second member in response to rotation of said second steering shaft, and means on said horizontal axis connecting said first and second steering shafts and operable to effect rotation of said second steering shaft in response to rotation of said first steering shaft.

23. A marine propulsion device in accordance with claim 22 wherein said second and third members are constituted by the upper and lower sections of a drive shaft housing.

24. A marine propulsion device in accordance with claim 23 wherein the axes about which said first and second steering shafts rotate intersect said horizontal axis at a right angle.

25. A marine propulsion device in accordance with claim 22 wherein said first member is constituted by one of a pair of spaced supporting members adapted to be secured to a boat hull and in which said second member has a pair of oppositely extending generally horizontal trunnions which are received in coaxial apertures in said supporting members.

26. A marine propulsion device in accordance with claim 25 wherein said means connecting said first and second steering shafts includes a further shaft rotatably supported within one of the trunnions of said second member and gearing connecting said further shaft to each of said first and second shafts.

27. A marine propulsion device in accordance with claim 22 wherein said second shaft is arranged to transmit drive to a gear sector connected to said third member.

28. A marine propulsion device as claimed in claim 27 in which the means for transmission of drive from the second shaft to the gear sector includes another shaft rotatably supported in said second member, a gear on said another shaft in mesh with the gear sector and gearing connecting the second shaft to said another shaft.

29. A marine propulsion device comprising a drive shaft rotatably supported in a drive shaft housing, a member adapted to be fixed relative to a boat hull, first and second spaced means for mounting the drive shaft housing for vertical swinging movement relative to said member about a horizontal axis, a horizontal cross shaft for the transmission of power from an input shaft to the drive shaft, and means for supporting said cross shaft in coaxial relation with said horizontal axis, said supporting means being disposed intermediate said first and second spaced mounting means and including a first part fixed relative to said member and a second part which is fixed relative to the drive shaft housing for movement therewith about said horizontal axis.

30. A marine propulsion device comprising a drive shaft housing having means affording vertical tilting movement about a horizontal axis relative to a boat hull and also having upper and lower housing sections with said lower housing section rotatably connected to said upper housing section for rotation about a steering axis and a linkage including a first part extending coaxially with said horizontal axis and a second part extending within said drive shaft housing, having a rotary axis extending from said horizontal axis, and connected to said first part and to said lower housing section for steering actuation of said lower housing section regardless of the position of said drive shaft housing relative to said horizontal tilt axis.

31. A marine propulsion device in accordance with claim 30 wherein said first part is supported for rotary

*movement coaxially with said horizontal tilt axis and extends, at least in part, within said drive shaft housing.*

*32. A marine propulsion device comprising a drive shaft housing having means affording vertical tilting movement about a horizontal axis relative to a boat hull and also having upper and lower housing sections with said lower housing section rotatably connected to said upper housing section for rotation about a steering axis and a linkage including a first part extending on said horizontal axis and a second part having a rotary axis extending from said horizontal axis, and connected to said first part and to said lower housing section for steering actuation of said lower housing section regardless of the position of said drive shaft housing relative to said horizontal tilt axis.*

*33. A marine propulsion device in accordance with claim 32 wherein said first part is supported for rotary movement coaxially with said horizontal tilt axis and extends, at least in part, within said drive shaft housing.*

*34. A marine propulsion device comprising a first member adapted to be secured to a boat adjacent the stern thereof, a second member connected to said first member for vertical tilting movement relative thereto about a horizontal axis, a third member connected to said second member for pivotal movement relative thereto about an axis transverse to said horizontal axis, a first steering shaft rotatably mounted on said first members, a second steering shaft rotatably mounted on said second member*

*and extending radially with respect to said horizontal axis for steering of said third member relative to said second member in response to rotation of said second steering shaft, and a steering linkage member located on said horizontal axis and operably connected to said first and second steering shafts.*

References Cited

The following references, cited by the Examiner, are of record in the patented file of this patent or the original patent.

UNITED STATES PATENTS

| | | | |
|---|---|---|---|
| 3,605,677 | 9/1971 | Bergstedt | 115—35 |
| 3,654,889 | 4/1972 | Bergstedt | 115—35 |
| 2,755,765 | 7/1956 | Wanzer | 74—385 X |
| 3,094,967 | 6/1963 | Willis, Jr. | 115—35 |
| 3,362,246 | 1/1968 | Bergstedt | 74—385 X |
| 3,489,120 | 1/1970 | Strang | 115—35 X |

FOREIGN PATENTS

| | | | |
|---|---|---|---|
| 697,882 | 11/1964 | Canada | 115—18 |
| 790,804 | 2/1958 | Great Britain | 115—18 |
| 969,857 | 9/1964 | Great Britain. | |

LEONARD H. GERIN, Primary Examiner

U.S. Cl. X.R.

115—18 R, 35

UNITED STATES PATENT OFFICE
CERTIFICATE OF CORRECTION

Patent No. RE. 27,826 Dated December 4, 1973

Inventor(s) John A. Langley

It is certified that error appears in the above-identified patent and that said Letters Patent are hereby corrected as shown below:

Column 5, line 19, after "sections" delete "and".

Signed and sealed this 27th day of August 1974.

(SEAL)
Attest:

McCOY M. GIBSON, JR.
Attesting Officer

C. MARSHALL DANN
Commissioner of Patents